(12) United States Patent
Azam et al.

(10) Patent No.: US 11,994,903 B2
(45) Date of Patent: May 28, 2024

(54) DISPLAY DEVICES AND COMPUTER SYSTEM WITH PROTRACTIBLE HOOKS FOR CHARGING

(71) Applicant: Hewlett-Packard Development Company, L.P., Spring, TX (US)

(72) Inventors: Syed S Azam, Spring, TX (US); Dimitre Mehandjiysky, Spring, TX (US); Alexander Williams, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 415 days.

(21) Appl. No.: 17/042,151

(22) PCT Filed: Sep. 28, 2018

(86) PCT No.: PCT/US2018/053290
§ 371 (c)(1),
(2) Date: Sep. 27, 2020

(87) PCT Pub. No.: WO2020/068096
PCT Pub. Date: Apr. 2, 2020

(65) Prior Publication Data
US 2021/0208626 A1   Jul. 8, 2021

(51) Int. Cl.
*G06F 1/26*    (2006.01)
*G05B 19/042*  (2006.01)
*G06F 1/16*    (2006.01)
*G06F 8/65*    (2018.01)

(52) U.S. Cl.
CPC ......... *G06F 1/1607* (2013.01); *G05B 19/042* (2013.01); *G06F 1/266* (2013.01); *G06F 8/65* (2013.01); *G05B 2219/25353* (2013.01)

(58) Field of Classification Search
None
See application file for complete search history.

(56) References Cited

U.S. PATENT DOCUMENTS

| 6,175,960 B1 | 1/2001 | Knittel |
| 8,155,367 B2 | 4/2012 | Singh |
| 8,483,755 B2 | 7/2013 | Kumar |
| 9,531,207 B2 | 12/2016 | Lowles |

(Continued)

FOREIGN PATENT DOCUMENTS

| CN | 102362238 A | 2/2012 |
| CN | 103189815 A | 7/2013 |

(Continued)

OTHER PUBLICATIONS

English translation of Goto et al. Japanese Patent Document JP2005222607 published 2005.*

(Continued)

*Primary Examiner* — Bernard G Lindsay
(74) *Attorney, Agent, or Firm* — Quarles & Brady LLP

(57) ABSTRACT

An example display device includes a housing, a protractible hook fittable within the housing, a charging device coupled to the protractible hook, and an actuation member that moves the protractible hook from the retracted position to a protracted position where the protractible hook is positioned external to the housing.

16 Claims, 11 Drawing Sheets

(56) References Cited

U.S. PATENT DOCUMENTS

| | | | |
|---|---|---|---|
| 2010/0250818 A1* | 9/2010 | Gill | G06F 1/1632 |
| | | | 710/304 |
| 2011/0019360 A1* | 1/2011 | Thabit | G06F 1/1616 |
| | | | 361/679.55 |
| 2011/0127953 A1* | 6/2011 | Walley | G06K 19/0723 |
| | | | 320/108 |
| 2011/0141357 A1 | 6/2011 | Price et al. | |
| 2012/0113576 A1 | 5/2012 | Cooper et al. | |
| 2012/0282858 A1 | 11/2012 | Gill et al. | |
| 2013/0093388 A1 | 4/2013 | Partovi | |
| 2013/0175875 A1* | 7/2013 | Kurs | B60L 53/36 |
| | | | 307/104 |
| 2014/0143572 A1* | 5/2014 | Horiuchi | G06F 9/4418 |
| | | | 713/323 |
| 2015/0002088 A1* | 1/2015 | D'Agostino | H02J 50/70 |
| | | | 320/108 |
| 2015/0116916 A1 | 4/2015 | Cooper et al. | |
| 2015/0277559 A1* | 10/2015 | Vescovi | G06F 3/017 |
| | | | 345/173 |
| 2020/0006966 A1* | 1/2020 | Lu | H02J 7/0042 |

FOREIGN PATENT DOCUMENTS

| | | |
|---|---|---|
| CN | 204087053 U | 1/2015 |
| CN | 206331328 U | 7/2017 |
| CN | 206788733 U | 12/2017 |
| CN | 207802280 U | 8/2018 |
| JP | 2005217559 A | 8/2005 |
| JP | 2006033762 A | 2/2006 |
| WO | 2010/110958 A2 | 9/2010 |
| WO | WO-2017074300 A1 | 5/2017 |

OTHER PUBLICATIONS

BackBeat Pro User Guide, Plantronics, published 2015.*

English translation of Omori et al. Japanese Patent Document JP2001266442 published 2001.*

* cited by examiner

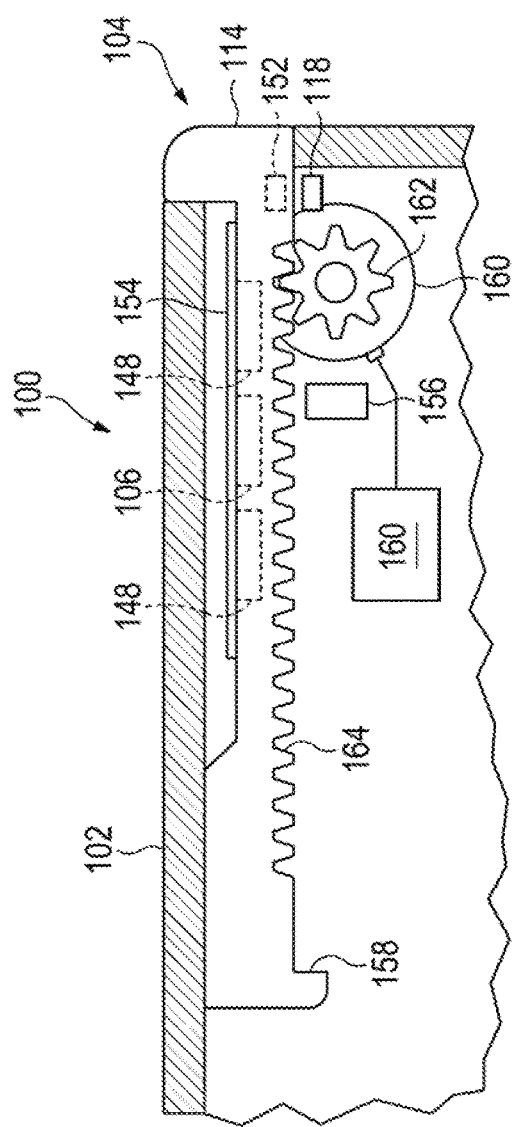
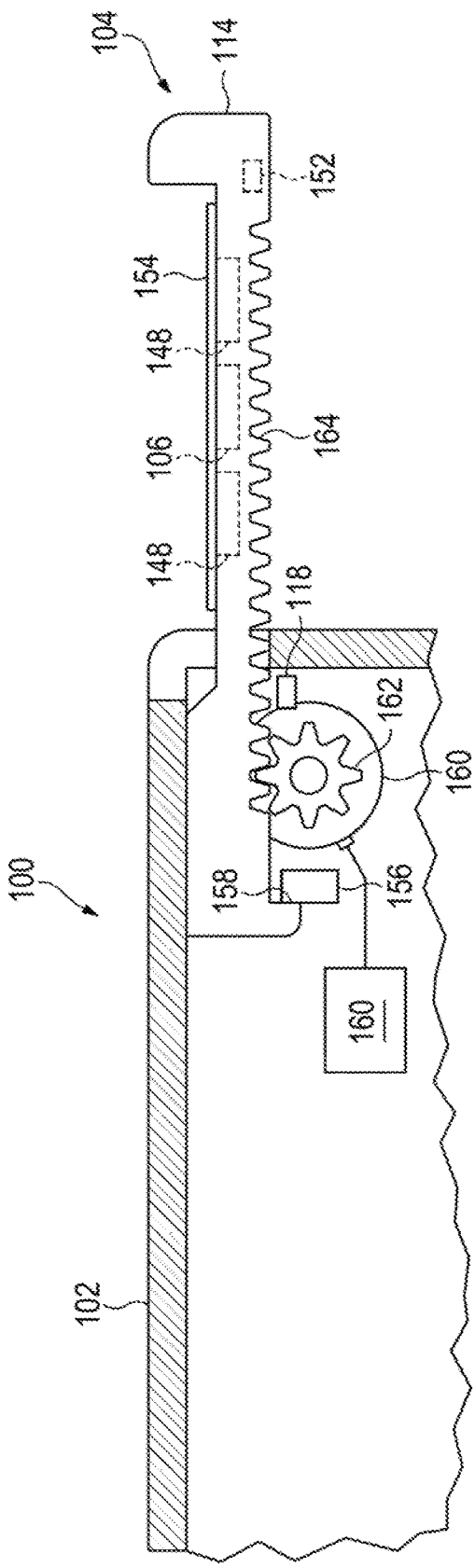

DISPLAY DEVICES AND COMPUTER SYSTEM WITH PROTRACTIBLE HOOKS FOR CHARGING

BACKGROUND

Peripherals are commonly used with computers. For example, a desktop computer device may utilize a number of human interface devices, such as a mouse, a keyboard, a camera, a printer, headphones, and the like. Some peripherals, when not in use, may be stored on the same surface of the computer device (such as a desk top), on a separate surface (such as a shelf), or in a container (such as a drawer).

BRIEF DESCRIPTION OF THE DRAWINGS

FIGS. 11-14 are sectional views of example protractible hooks in example states of operation.

DETAILED DESCRIPTION

Figure 1:
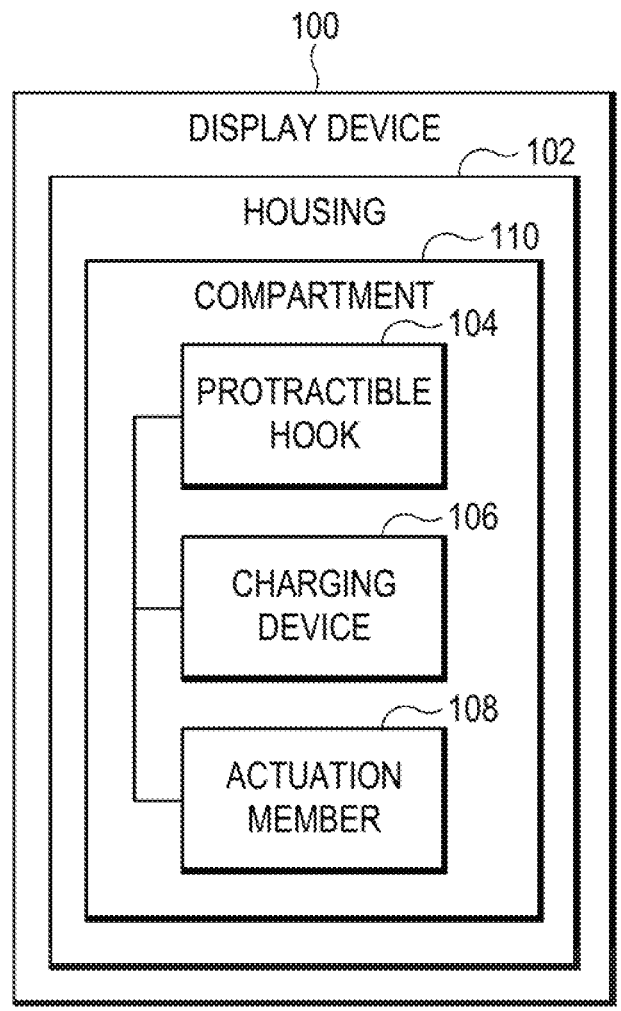
FIGS. 1-3 are block diagrams depicting example display devices.

In the following description and figures, some example implementations of display devices having a protractible hook, all-in-one computer systems having a protractible hook, and/or methods of operating a protractible hook are described. As used herein, a display device is an apparatus having a display for producing images, Example display devices include a monitor, a television, and a mobile device, such as a tablet. An all-in-one computer system, as used herein, represents a computer system that includes a display device and a computer system with computing resources to execute an operating system. Example all-in-one systems may be a desktop computer with an integrated screen or a laptop computer.

Computer systems, such as all-in-one computer systems, may include ports to attach peripherals which allow for providing additional computing features or for enhancing the user experience of the computer system. An example peripheral is a headphone device. As used herein, a headphone device represents an electronic device with at least one speaker coupled to a support formed to be wearable on at least a portion of a head of a human being. Example headphone devices may include over-the-ear headphones, a single speaker headset with a microphone, in-ear earphones, a virtual reality headset, and the like. Example headphone devices may surround the outside of the ear, rest on the ear; or fit inside the ear canal. Example headphone devices may be wired or wirelessly operable.

Such peripherals may generally be stored in a container, such as a desk drawer, or on a desk surface when not in use. A user may connect the peripheral to computer system for each intended use, remove the peripheral after use, and stow the peripheral away when not being used for an extended period of time. In some examples, a headset may be left on the desk when not in use. To improve desk space issues, ergonomics, and utility, a hook mounted to a desk, wall, computer case, or monitor may be used to store headphones when not in use, as examples. Some peripherals are wireless for communication and/or power. Such wireless devices may utilize a charging station, which may also take up limited space on the desk top where the keyboard and mouse are located, for example.

Various examples described below relate to a display device having a protractible hook with charging capabilities. The protractible hook may be retained in a compartment while not in use, and the hook may protract to a useable orientation ready to sustain a headphone device when desired by the user, In this manner, the protractible hook may protract in a controlled manner to reveal a charging station capable of sustaining the headphones when not in use and retract into the display device when the headphones are in use and the hook is no longer desired. This may improve the user experience and decrease clutter on the limited space of the desktop on which a display device and/or all-in-one computer system may reside, for example.

Figure 2:
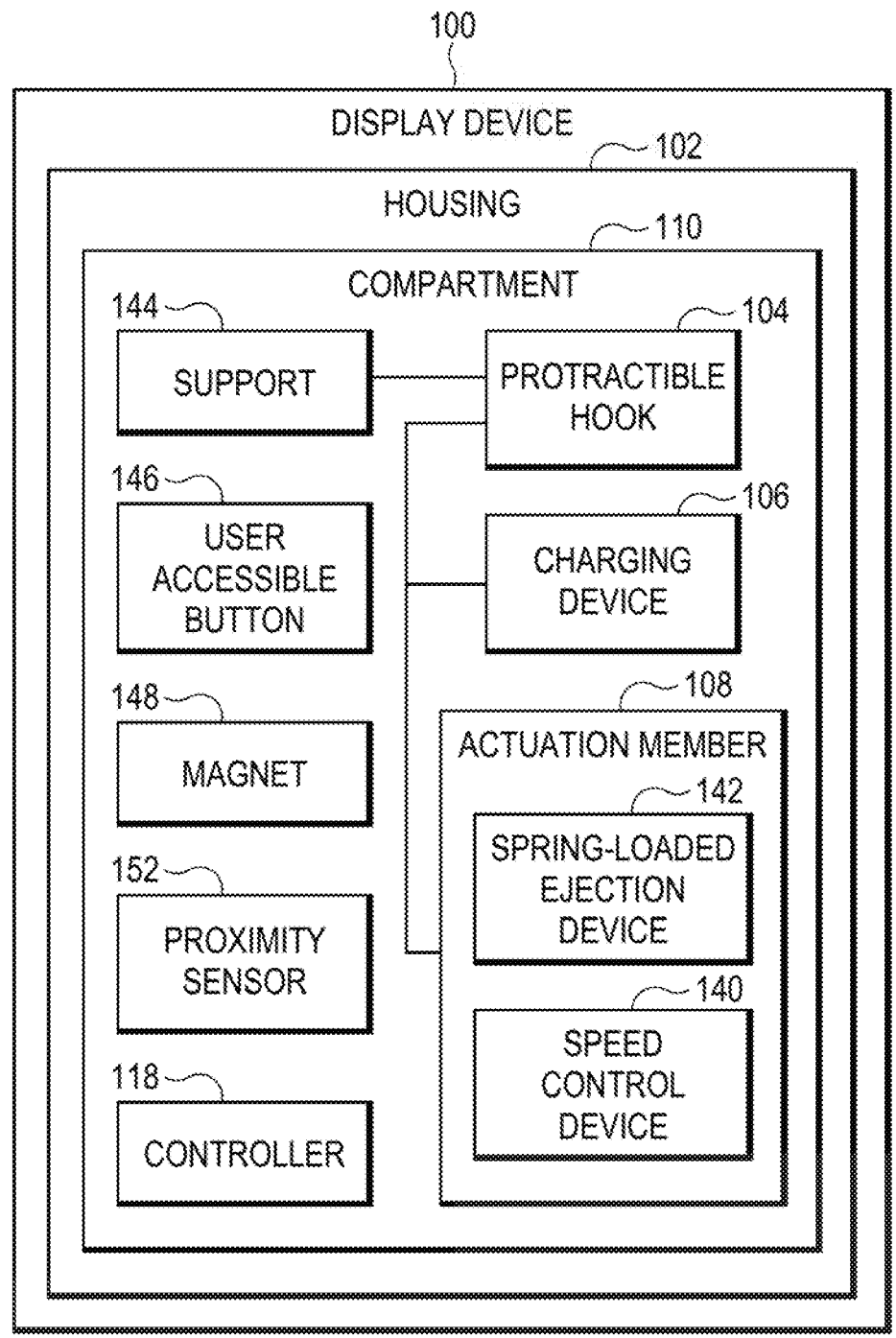
Figure 3:
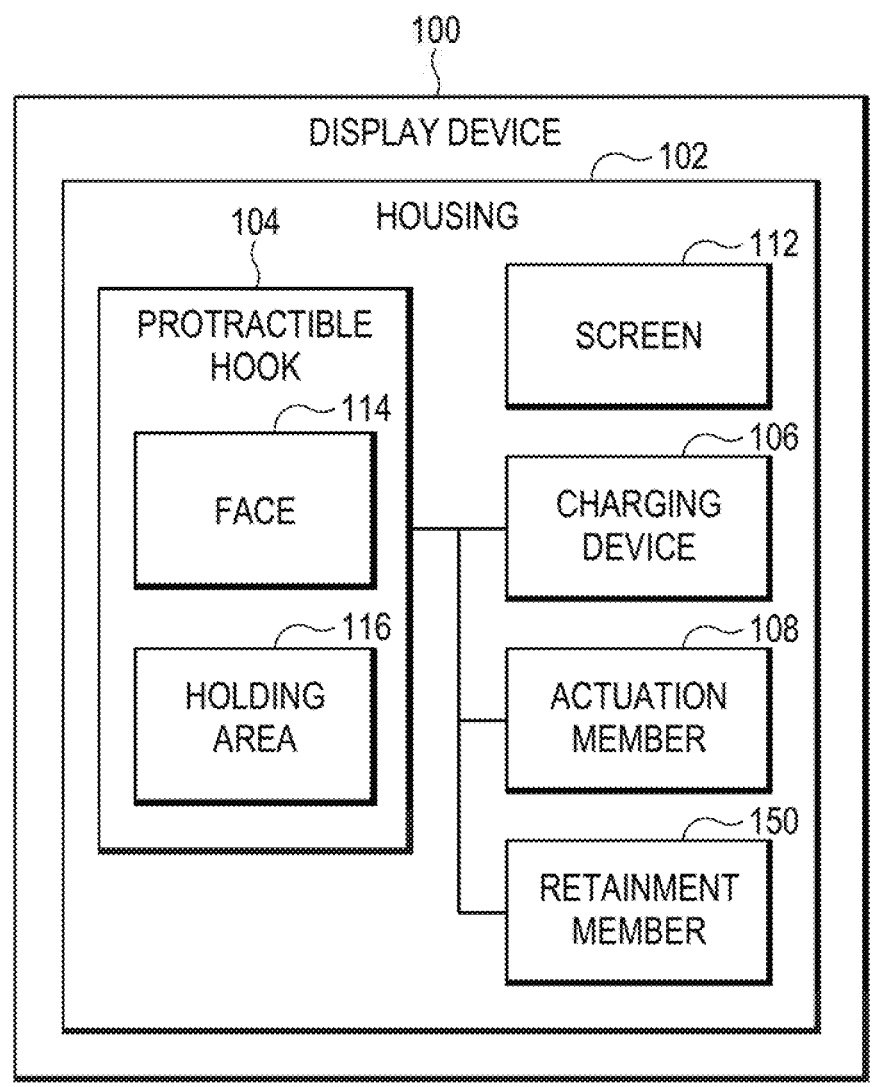

FIGS. 1-3 are block diagrams depicting example display devices 100. Referring to FIG. 1, the example display device 100 of FIG. 1 generally includes a housing 102, a protractible hook 104, a charging device 106, and an actuation member 108. In general, the actuation member 108 causes the protractible hook 104 to move in and out of a compartment 110 of the housing 102 to allow a headphone device to rest on the protractible hook 104 and be charged by the charging device 106.

The housing 102 of a display device 100 represents an enclosure for a screen. The housing 102 may have component parts including a bezel and a bucket panel. In this manner, the housing 102 may include components such as a front face, a side wall, a back panel, a top wall, and a bottom wall. The housing 102 includes structure that defines a compartment 110 to house the protractible hook 104. The protractible hook 104 is fittable within the compartment 110 of the housing 102 when the protractible hook 104 is in a retracted position.

The protractible hook 104 represents a prop having a curved or angular piece of a supportive substance for holding or suspending something, such as a headset. For examples, the protractible hook 104 may include a curved pole or a substantially flat resting surface (such as a tray) with a lip at a substantially perpendicular angle to act as a backstop to cradle a headphone device in place. The protractible hook 104 may be a cantilever having a free end for placing a headphone device upon and fixed end coupled to a support, such as support 144 of FIG. 2, to sustain the weight of the headphone device. A brace may be used to support the protractible hook 104 as desired.

A charging device 106 may be coupled to the protractible hook 104 to allow a peripheral, such as a headphone device to charge while sustained by the protractible hook 104. The charging device 106 represents an electronic device having a power source and capable of transferring power to a chargeable device. Charging devices may include charging via electrical connection or wireless charging. As example, the charging device may charge via a direct electrical connection, via induction, via a near-field charging method, a far-field charging method, or the like.

The protractible hook 104 may move among a plurality of positions. The actuation member 108 represents a mechanism capable of being activated to induce movement of the protractible hook 104. For example, the actuation member 108 may include a spring-loaded ejection device, such as spring-loaded ejection device 140 of FIG. 2. The actuation member 108 may move the protractible hook 104 between a retracted position within the compartment 110 of the housing 102 and a protracted position where the protractible hook 104 is positioned external to the housing 102. Thus, the protractible hook 104 is accessible to a user when in a protracted position and may not be accessible when in a retracted position.

The actuation member 108 provides controlled force to move the protractible hook 108 in a regulated manner. The actuation member 108 may include a spring, a piston, a pump, a motor, and the like. The actuation member 108 may include integrated or additional components to control the movement. For example, the actuation member 108 may include a speed control device, such as speed control device 142 of FIG. 2, to control movement speed of the protractible hook 104 between the retracted position and the protracted position. Controlled movement may include increasing speed, decreasing speed, movement at a steady rate, or stepped positioning. Examples of components that may be part of a speed control device include variable gear ratios, a stop, a wall having a particular friction property to control speed, a soft-open device, a soft-close device, a spring arm, a cam, a compressible foam or spring, a piston or other hydraulic mechanism, and the like.

The actuation member 108 may activate or provide control based on user interaction. For example, the actuation member 108 may be mechanically coupled to the protractible hook 104 such that, in response to user interaction with a housing component (or a peripheral connectable to an all-in-one computer system), a motor drives the protractible hook between the retracted position within the housing component and the protracted position projecting from the housing component. The user interaction may be direct or indirect. For example, the user may push on the face of the protractible hook 104 to activate the actuation member 108, the user may push on a button separate from the protractible hook 104 and/or actuation member 108, or the user may interact with a human interface device (such as a keyboard, mouse, touchpad, or camera) that causes activation of the actuation member 108. Other example features the user may interact with to activate the actuation member 108 may include the protractible hook itself, a button separate to the protractible hook, the display housing 102 (such as buy tapping on the bezel or display in a manner corresponding to a gesture), an on-screen display, a peripheral key input, a proximity sensor, an image capture device (e.g., to capture a gesture), a system-level function call such as a software interrupt, and the like. In some examples, there may be multiple protractible hooks coupled to a display device, such has including a protractible hook on the left side of the display device and another on the right side of the display device.

Referring to FIG. 2, the display device may include accessibility features, such as a user-accessible button 146 and a proximity sensor 152, and alignment components, such as a magnet 148. The user-accessible button 146 represents a physical contact point of the housing 102 to activate the actuation member 108 to move the protractible hook 104. The magnet 148 may be located on or near the protractible hook 104 to align the position of the peripheral to lay properly on the protractible hook 104, to ensure charging contacts of the charging device 106 are properly aligned with a charging port of the peripheral, as an example.

The proximity sensor 152 represents circuitry to identify whether an object is nearby (e.g., within a threshold range of the sensor 152). Example proximity sensors include capacitive sensors, inductive sensors, optical sensors, sonar sensors, electromagnetic sensors, and the like.

A controller 118 may be used in conjunction with the proximity sensor 152. The controller 118 may, for example, activate the actuation member 108 when the proximity sensor 152 detects the presence of a peripheral to be placed on the protractible hook 104 and/or activate the charging device 106 based upon location data identified by the proximity sensor 152. In another example, the charging device 106 may provide power transfer and wireless data communication transfer with a wirelessly operable device when the wirelessly operable device is within a range threshold as indicated by the proximity sensor 152.

The controller 118 represents a processor resource and a machine-readable medium having a control program stored thereon. The control program, when executed by the processor resource, causes the controller to operate according to the control program. For example, the controller 118 may execute instructions that cause the controller 118 to activate an actuation member (e.g., a motor) to move the protractible hook to a protracted position or the retracted position (e.g., based on location data provided by the proximity sensor 152). For another example, the controller 118 may execute instructions that cause the controller 118 to activate charging device 106 when the protractible hook 104 is in a protracted position (e.g., start charging operations when the protractible hook 104 reaches the protracted position). For yet another example, the control program may be executed to cause the controller 118 to request system information of a wirelessly operable device, cause an interface to provide a power status indicator, transfer the software update to the wirelessly operable device in response to the system information indicating a software update exists, and deactivate wireless charge operations and wireless data communication in response to a determination (by the controller 118) that the location data indicates the wirelessly operable device is outside the range threshold. The controller 118 may be pairable with a wirelessly operable device, such as via a personal area network communication method.

Referring to FIG. 3, the display device 100 generally includes a screen 112, a housing 102 around the screen 112, a protractible hook 104, a charging device 106, an actuation member 108, and a retainment member 150. The screen 112 represents the surface on which a visual representation of output of an electronic device is displayed. The housing 102 may include a side wall having an aperture. The protractible hook 104 may be protractible and retractable into the housing 102 at the aperture of the side wall.

The protractible hook 104 may include a face 114 and a holding area 116. The face 114 may be a surface to cover an aperture of the housing 102 (e.g., a port to the compartment 110 of FIG. 1) when the protractible hook 104 is in a retracted position. The face 114 may be fittable within the aperture of the housing; for example, the face 114 may have the same shape as the defined aperture. In some examples, the face to cover the aperture of the housing 102 may be separate to the protractible hook 104 and operate independently or in conjunction with movement of the protractible hook 104. For example, the face may be a door integrated into the housing 102.

The protractible hook 104 may include a holding area 116. The holding area 116 is a surface of the protractible hook 104 on which a peripheral may be placed to be sustained by the protractible hook 104. The holding area 116 may be perpendicular or oblique to the face 114. The slope of the holding area 116 in combination with a lip (such as the face 114) may encourage retainment of a peripheral within the holding area 116. As discussed further herein, the holding area 116 may also include access to the charging device 106, alignment features, protective features, and the like.

The retainment member 150 represents a mechanism capable of sustaining the protractible hook in a retracted position. For example, the retainment member may be activated to reduce movement of the protractible hook 104 in the retracted position in response to a mechanical event, such as a mechanical event activatable by user interaction. Example retainment members may be a stop, a gear-locking feature, a detent in a spring arm, and the like. In an example, the actuation member 108 is coupled to the protractible hook 104 to move the protractible hook 104 from the retracted position to a protracted position in response to a first mechanical event activatable by user interaction, and the retainment member 150 is coupleable to the protractible hook 104 to sustain the protractible hook in the retracted position in response to a second mechanical event activatable by user interaction.

Figure 4:
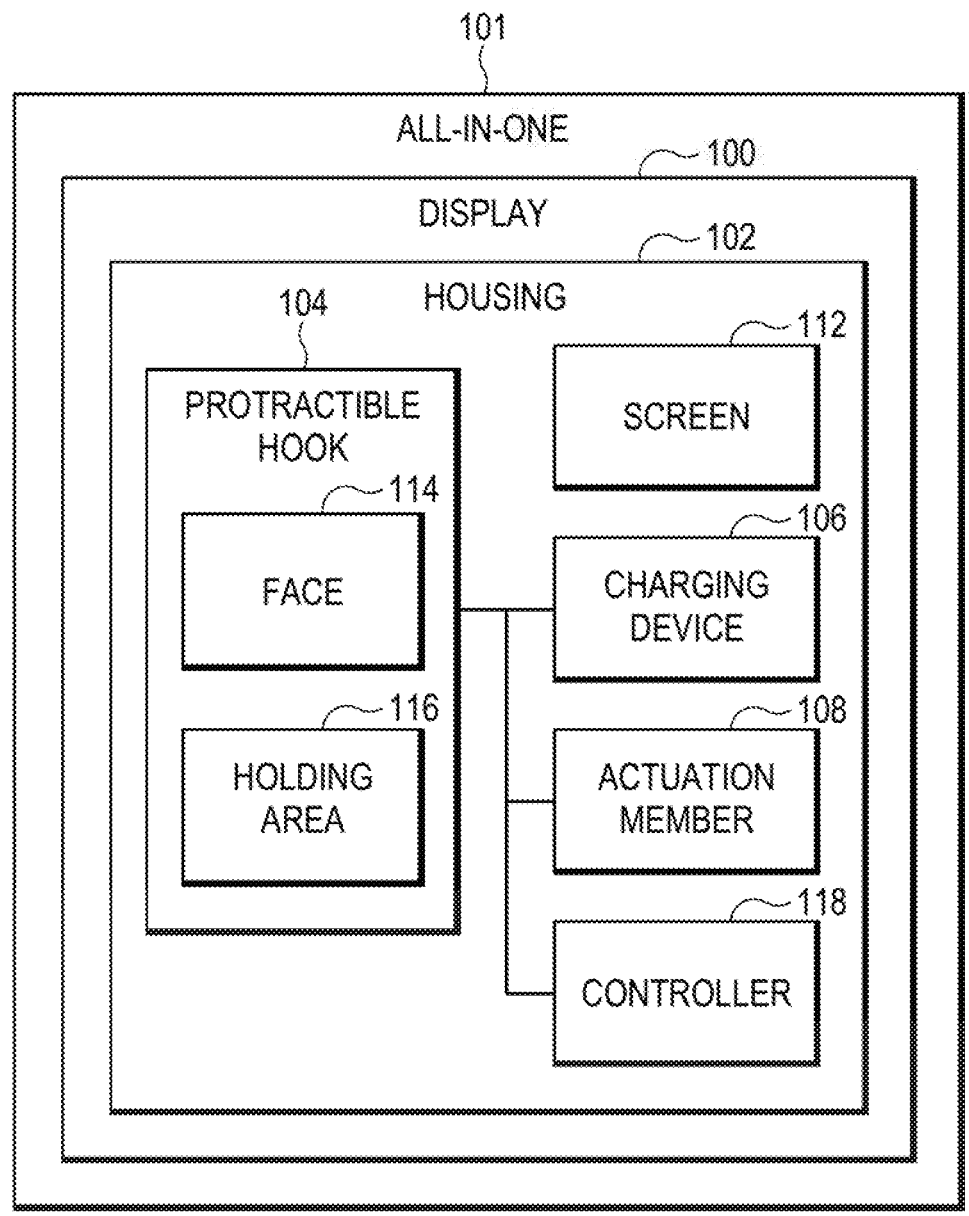
FIG. 4 is block diagram depicting an example all-in-one computer device.

FIG. 4 is block diagram depicting an example all-in-one computer system 101. The all-in-one computer system 101 generally includes a display 100, a housing component 102, a protractible hook 104, a charging device 106, an actuation member 108, and a controller 108. The housing component 102 may be coupled to the display and form a cavity (such as compartment 110 of FIG. 1) in which the protractible hook 104 may reside. The protractible hook 104 may be integral to the housing and able to extend to the exterior of the housing. For example, the protractible hook 104 may have a periphery that fits within the cavity, a holding area 116 capable of supporting weight of a wirelessly operable device when the protractible hook 104 is in a protracted position, and a face 114 aligned about flush with a surface of the housing component 102 (e.g., the exterior side wall of the housing) when the protractible hook 104 is in a retracted position. The charging device 106 may be integrated in the protractible hook 104 or otherwise accessible via the protractible hook 104, such as including a contact point or charging port within the holding area 116 of the protractible hook 104. In this manner, the actuation member 108 may mechanically actuate movement of the protractible hook 104 to a position where the charging area of the charging device 106 is accessible. In that example, the controller 118 may activate the charging device 106 when the protectible hook 104 is protracted to the charging-accessible position.

Figure 5:
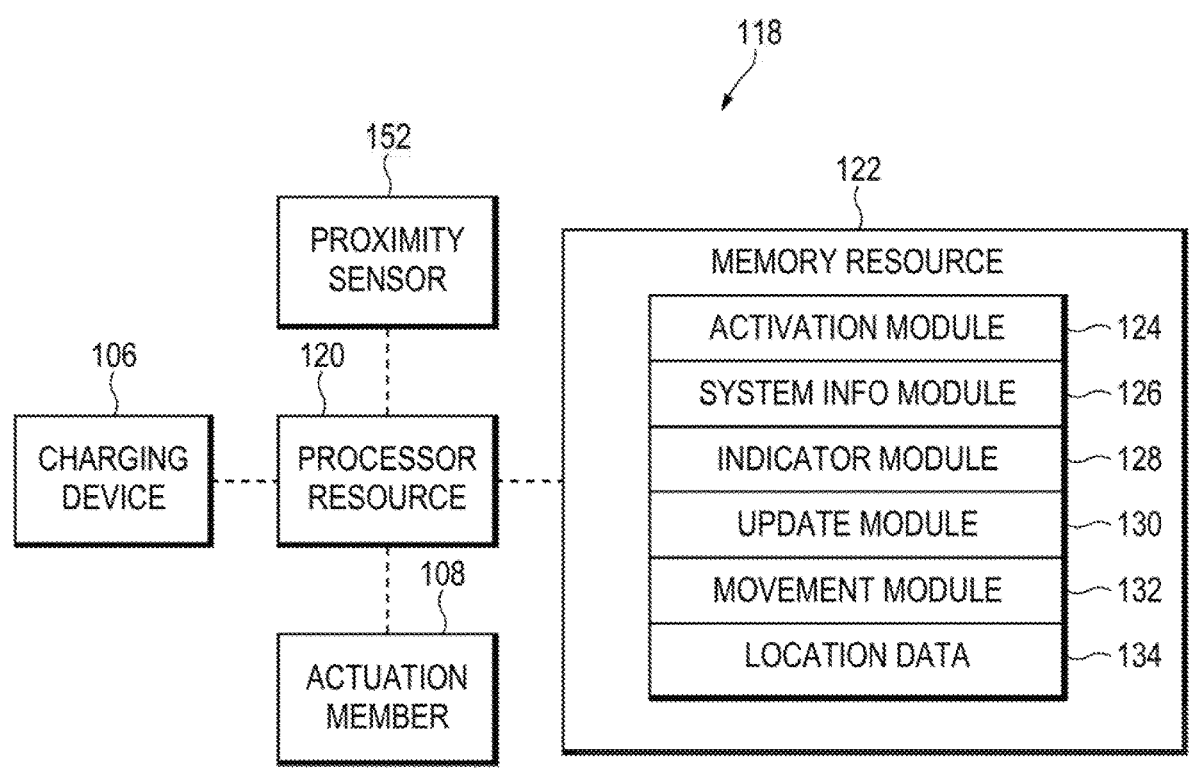
FIG. 5 is a block diagram depicting example components of a display device.

FIG. 5 is a block diagram depicting example components of a display device. The components may include a charging device 106, an actuation member 108, a proximity sensor 152, and a controller 118. The charging device 106, the actuation member 108, and the proximity sensor 152 may be coupled to the processor resource 120 of the controller 118 to coordinate operation of those components.

The controller 118 may include a memory resource 122. The memory resource 122 may contain data useable by the controller 118, such as location data 134 provided from a proximity sensor 152. The memory resource 122 may contain a set of instructions that are executable by the processor resource 120. The set of instructions are operable to cause the processor resource 120 to perform operations of the display device when the set of instructions are executed by the processor resource 120. The set of instructions stored on the memory resource 122 may be represented as an activation module 124, a system information module 126, an indicator module 128, an update module 130, and a movement module 132. The activation module 124, the system information module 126, the indicator module 128, the update module 130, and the movement module 132 represent program instructions that when executed cause function of the charging device 106, the actuation member 108, and/or the proximity sensor 152. The processor resource 120 may carry out a set of instructions to execute the modules 124, 126, 128, 130, 132, and/or any other appropriate operations associated with a display device. For example, the processor resource 120 may carry out a set of instructions to perform operations corresponding to the description of method 600 of FIG. 6.

Although these particular modules and various other modules are illustrated and discussed in relation to FIG. 5 and other example implementations, other combinations or sub-combinations of modules may be included within other implementations. Said differently, although the modules illustrated in FIG. 5 and discussed in other example implementations perform specific functionalities in the examples discussed herein, these and other functionalities may be accomplished, implemented, or realized at different modules or at combinations of modules. For example, two or more modules illustrated and/or discussed as separate may be combined into a module that performs the functionalities discussed in relation to the two modules. As another example, functionalities performed at one module as discussed in relation to these examples may be performed at a different module or different modules.

A processor resource is any appropriate circuitry capable of processing (e.g., computing) instructions, such as one or multiple processing elements capable of retrieving instructions from a memory resource and executing those instructions. For example, the processor resource 120 may be a central processing unit (CPU) that enables operation of a protractible hook and a charging device by fetching, decoding, and executing modules 124, 126, 128, 130, and 132. Example processor resources include at least one CPU, a semiconductor-based microprocessor, a programmable logic device (PLD), and the like. Example PLDs include an application specific integrated circuit (ASIC), a field-programmable gate array (FPGA), a programmable array logic (PAL), a complex programmable logic device (CPLD), and an erasable programmable logic device (EPLD). A processor resource may include multiple processing elements that are integrated in a single device or distributed across devices. A processor resource may process the instructions serially, concurrently, or in partial concurrence.

A memory resource represents a medium to store data utilized and/or produced by a display device. The medium is any non-transitory medium or combination of non-transitory media able to electronically store data, such as modules of a display device and/or data used by the display device. For example, the medium may be a storage medium, which is distinct from a transitory transmission medium, such as a signal. The medium may be machine-readable, such as computer-readable, The medium may be an electronic, magnetic, optical, or other physical storage device that is capable of containing (i.e., storing) executable instructions. A memory resource may be said to store program instructions that when executed by a processor resource cause the processor resource to implement functionality of a display device, such as the display device 100 of FIG. 1. A memory resource may be integrated in the same device as a processor resource or it may be separate but accessible to that device and the processor resource. A memory resource may be distributed across devices.

In the discussion herein, the controller 118 has been described as circuitry or a combination of circuitry and executable instructions. Such components may be implemented in a number of fashions. Looking at FIG. 5, the executable instructions may be processor-executable instructions, such as program instructions, stored on the memory resource 122, which is a tangible, non-transitory computer-readable storage medium, and the circuitry may be electronic circuitry, such as processor resource 120, for executing those instructions. The instructions residing on a memory resource may comprise any set of instructions to be executed directly (such as machine code) or indirectly (such as a script) by a processor resource.

Figure 6:
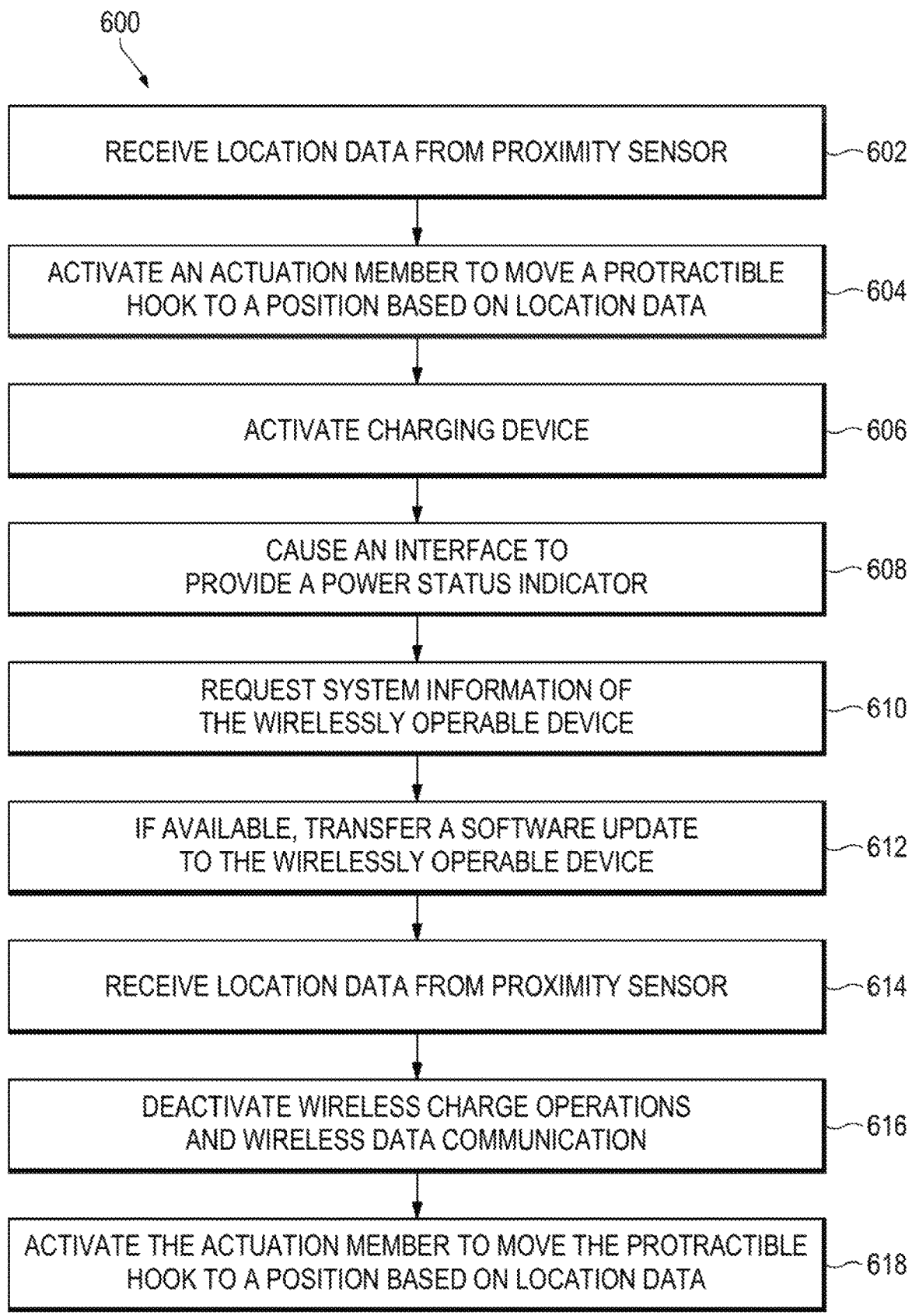
FIG. 6 is a flow diagrams depicting example methods of operating a display device with a protractible hook.

In some examples, the executable instructions may be part of an installation package that when installed may be executed by a processor resource to perform operations of a display device, such as the method 600 described with regards to FIG. 6. In that example, a memory resource may be a portable medium such as a compact disc, a digital video disc, a flash drive, or memory maintained by a computer device, such as a data server, from which the installation package may be downloaded and installed. In another example, the executable instructions may be part of an application or applications already installed. A memory resource may be a non-volatile memory resource such as read-only memory (ROM), a volatile memory resource such as random-access memory (RAM), a storage device, or a combination thereof. Example forms of a memory resource include static RAM (SRAM), dynamic RAM (DRAM), electrically erasable programmable ROM (EEPROM), flash memory, or the like. A memory resource may include integrated memory such as a hard drive (HD), a solid-state drive (SSD), or an optical drive.

FIG. 6 is a flow diagram depicting an example method 600 of operating a display device with a protractible hook. Referring to FIG. 6, example methods of operating a display device with a protractible hook may generally comprise identifying a peripheral using a proximity sensor, protracting the protractible hook, activating the charging device, and retracting the protractible hook, Such methods are performable by the display devices discussed herein using components such as a controller, an actuation member, and a proximity sensor.

At block 602, location data is received from a proximity sensor. The location data may represent a distance of a peripheral, such as a wirelessly operable device, with respect to the location of the proximity sensor. At block 604, the actuation member is activated to move the protractible hook to the protracted position based on the location data retrieved at block 602. For example, if the location data is representative of a peripheral moving to be placed on the protractible hook, the actuation member protracts the protractible hook from the interior of the display device to an exterior of the display device, At block 606, the charging device may be activated to allow the peripheral, such as a wirelessly chargeable headphone, to be charged by the charging device. Once the peripheral is charging, an interface is caused to activate a power status indicator, such as a power status indicator on the peripheral or on the display device, at block 608.

The display device may be setup to allow for updating software or firmware associated with the peripheral identified by the proximity sensor at block 602. At block 610, a request for system information is sent to a peripheral when the device is propped up by the protractible hook. At block 612, if a software update is available for the peripheral, the software update is transferred to the peripheral, such as over a wireless communication protocol.

At block 614, location data is received from the proximity sensor, such as location data indicating that the peripheral has been removed from the protractible hook, In response to the location data analysis indicating the protractible hook is no longer in use, any wireless charge operations or wireless data communications may be deactivated at block 616. At block 618, the actuation member is activated to move the protractible hook to a retracted position based on the location data identified at block 614.

Although the flow diagram of FIG. 6 illustrates a specific order of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

Figure 7:
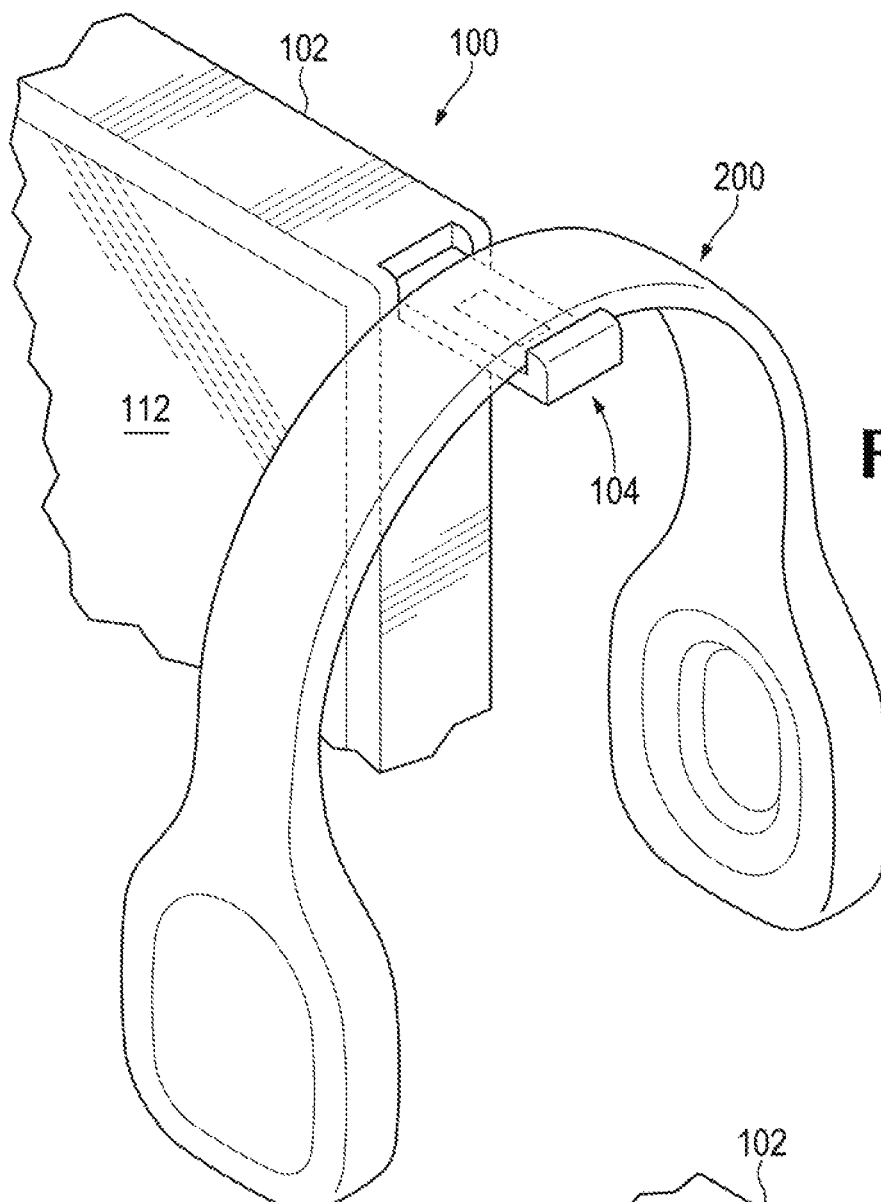
FIGS. 7-10 depict example protractible hooks useable with example displays.
Figure 8:
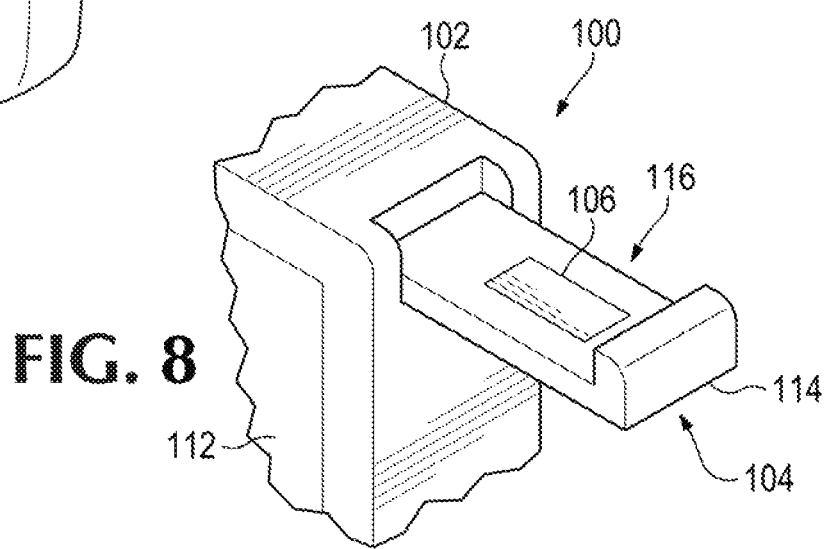

FIGS. 7-10 depict example protractible hooks 104 useable with example displays 100. Referring to FIGS. 7 and 8, the display 100 includes a housing 102 around a screen 112. A headphone device 200 is depicted as resting on a protractible hook 104, The headphone device 200 rests on the holding area 116 with the face 114 acting as a lip to sustain the headphone device 200 from falling off the protractible hook 104. The charging device 106 is exposed for access on the top surface of the protractible hook 104 within the holding area 116.

The protractible hook 104 depicted in FIGS. 7 and 8 is relatively flat, rectangular, and substantially parallel to the top surface of the housing 102. In this manner, the headphone device 200 may be propped above a desktop surface and may be charged at the same time. The face 114 of the protractible hook 104 is substantially rectangular and has a contour replicating the side wall of the housing 102 as well as a rounded corner that leads to the top wall of the housing 102. The periphery of the face lays flush with the top wall and side wall of the housing 102 when the protractible hook is retracted into the housing. In some examples, a second protractible hook may be coupled to the display device with corresponding components to operate the second protractible hook. For example, a plurality of hooks may be located on a side of a monitor or a single hook may be located each side of the monitor.

Figure 9:
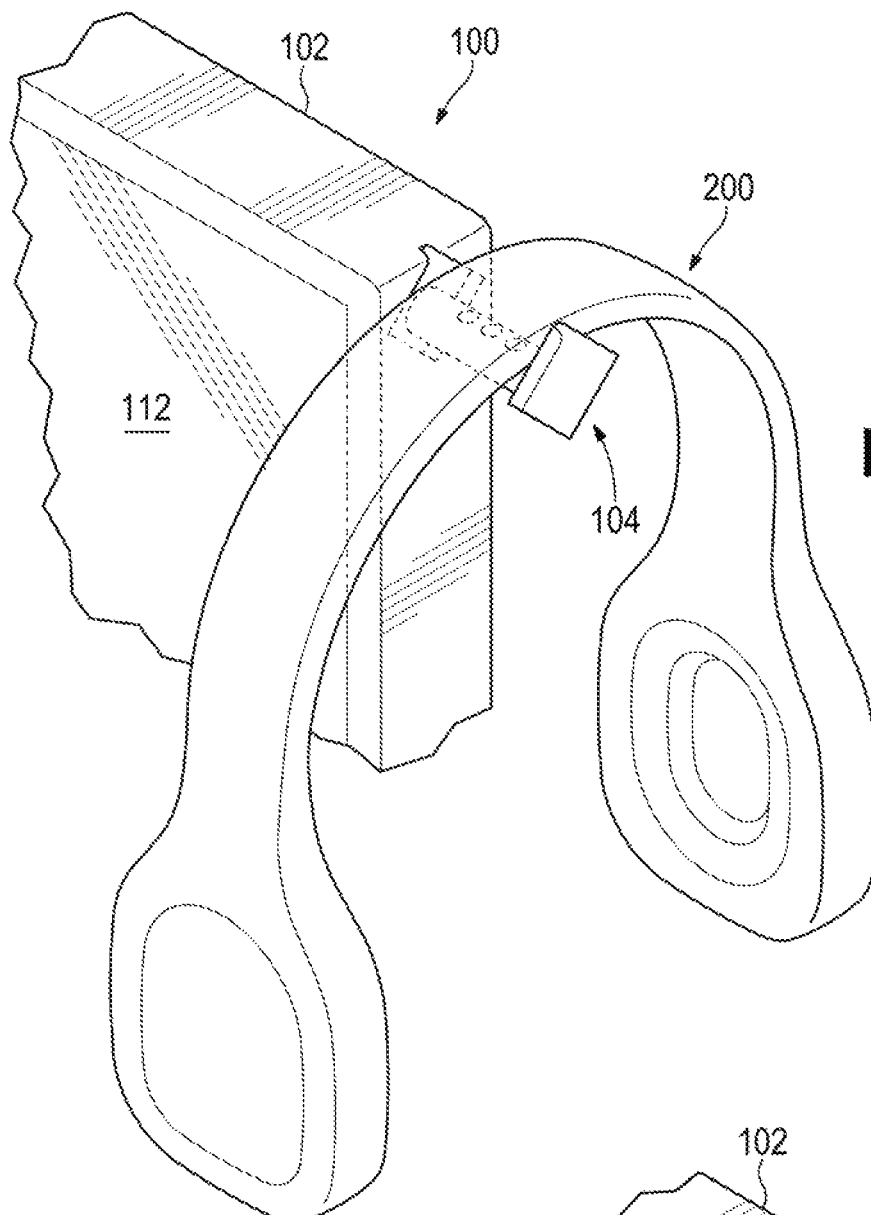
Figure 10:
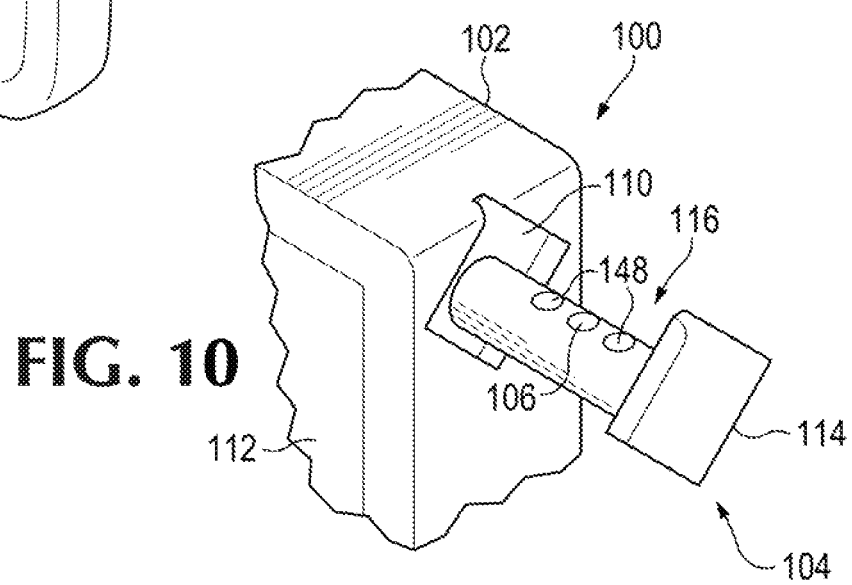

Referring to FIGS. 9 and 10, the display 100 includes a housing 102 around a screen 112 and a protractible hook 104 capable of protruding from the housing 102 and away from the screen 112. The surface of the protractible hook 104 may include a headphone receiving area 116 that is curved or oblique with respect to screen 112. A headphone device 200 is depicted as resting on a protractible hook 104. The headphone device 200 rests on the holding area 116 with the face 114 acting as a lip to sustain the headphone device 200 from falling off the protractible hook 104. The holding area 116 includes alignment magnets 148 to ensure the charging device 106 couples to the headphone 200. Each contact point may be a magnet and/or a power contact point in any appropriate combination. For example, three contact points may be magnets as well as a negative electrical contact, a positive electrical contact, or a ground contact. The charging device 106 is exposed for access on the top surface of the protractible hook 104 within the holding area 116 where the charging device 106 is activatable in response to contact between the surface of the protractible hook 104 and a wirelessly operable headphone device 200.

The protractible hook 104 depicted in FIGS. 9 and 10 is relatively cylindrical and substantially parallel to the top surface of the housing 102. In this manner, the headphone device 200 may be propped on a surface that curved or oblique with respect to the screen of the housing (e.g., a sloped surface with respect to the floor). The contour of the holding area 116 may replicate the contour of a particular device. For example, the holding area may have a curvature substantially the same as the curvature of the head cradle of the headphone device. The face 114 of the protractible hook 104 is substantially diamond shaped and has a contour replicating the side wall of the housing 102 as well as a rounded corner that leads to the top wall of the housing 102. The periphery of the face 114 lays flush with the top wall and side wall of the housing 102 when the protractible hook 104 is retracted into the cavity 110 of the housing 102, The face 114 may include a visual indicator, such as a logo or icon.

FIGS. 11-14 are sectional views of example protractible hooks 104 in example states of operation. Referring to FIGS. 11, the protractible hook 104 is in a retracted state where the protractible hook 104 resides within the housing 102. The face 114 is flushly aligned with the housing surfaces. Referring to FIG. 12, the protractible hook 104 is in a protracted state where the protractible hook 104 extends past the housing surface. The protractible hook 104 has teeth 164, The gear 162 rotates as driven by a motor 160 which may be controlled by controller 118. The protractible hook 158 includes a wall 158 that abuts a stop 156 and retains the protractible hook 104 in that position. The motor 160 acts as a speed control device to control the speed at which the gear 162 rotates and pushes the protractible hook 104.

The protractible hook 104 may be a cantilever. A support may be coupled to the protractible hook 104 at a fixed end and the charging device 106 may be located adjacent to a free end of the protractible hook 104. The support may be a wall, such as wall 158. The support may assist and sustain the protractible hook 104 when a peripheral of about 100 grams to 700 grams rests on the protractible hook 104, In some examples the protractible hook 104 may be unbraced and able to sustain a headphone device, while in other examples the protractible hook 104 may be braced with a tensile stay or a compression strut to support weight of the headphone device placed on the free end of the protractible hook 104.

The example protractible hook 104 of FIGS. 11-14 includes a cushion layer 154 and an electronics layer where the charging device 160 is embedded. The cushion layer 154 comprises a material different from the material of the other portions of the protractible hook. For example, the cushion layer 154 may have a textile or rubber material. The electronics layer may include electronics or devices to be moved with the protractible hook 104, such as the charging device 106 and the proximity sensor 152. The electronics layer may also include a magnet 148 coupled to the protractible hook 104.

In some examples, the charging device 106 is a near-field charging device. In some examples, the protractible hook 104 includes a wireless charging surface covering the near-filed charging device. In the examples of FIGS. 11-14, the cushion layer 154 may include a substantially flat wireless charging surface, The magnets 148 may guide alignment of a wirelessly chargeable device to rest on the wireless charging surface, where, in response to contact between the wirelessly chargeable device and the wireless charging surface, the charging device 106 activates to provide power to the wirelessly chargeable device.

Figure 13:
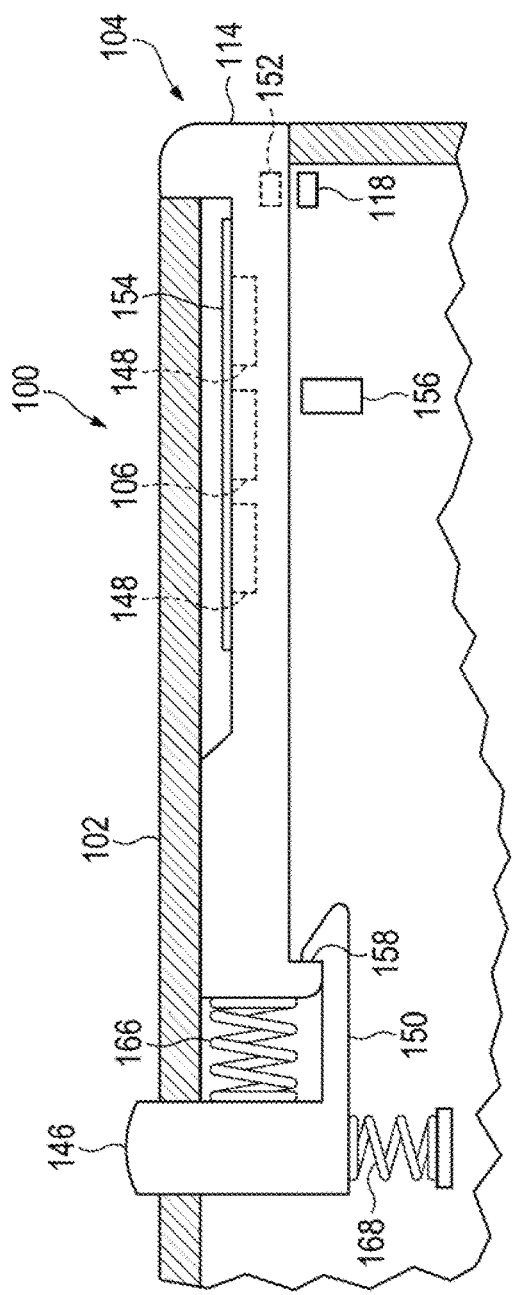
Figure 14:
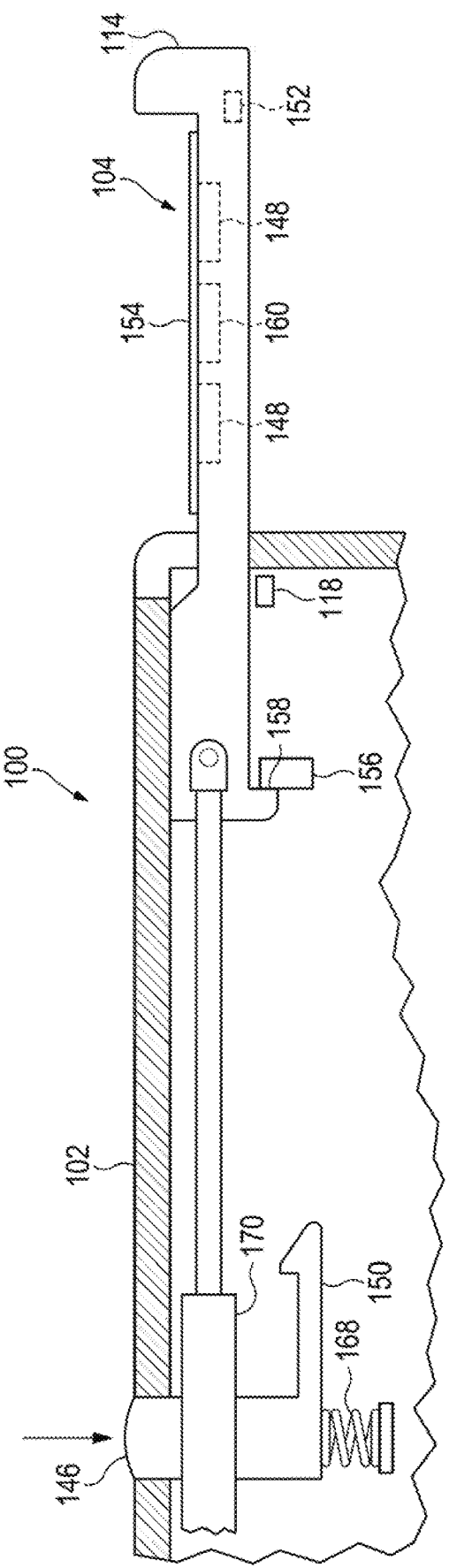

Referring to FIG. 13, the protractible hook 104 is in a retracted position. A spring-loaded ejection device 166 is coupled to the protractible hook 104. The protractible hook 104 is sustained in the retracted position with a retainment member 150. The retainment member 150 includes a wall that abuts the wall 158 of the protractible hook 104. A user-accessible button 146 is exposed above a surface of the housing 102. The spring 168 biases the user-accessible button and biases the retainment member 150 in a position to hold the wall 158 of the protractible hook 104, Referring to FIG. 14, the protractible hook 104 is in a protracted position. Pressure on the user-accessible button 146 compresses spring 168 and moves the retainment member 150 such that the wall 158 is released and allows the protractible member 104 to move outside of the housing 102. In the example of FIG. 14, the actuation member that causes the protractible hook 104 to move to a protracted position is a piston 170, The piston 170 may be designed to provide controlled pressure that moves the protractible hook 104 at a decreasing, regulated rate until the protractible hook 104 remains stopped.

Figure 15:
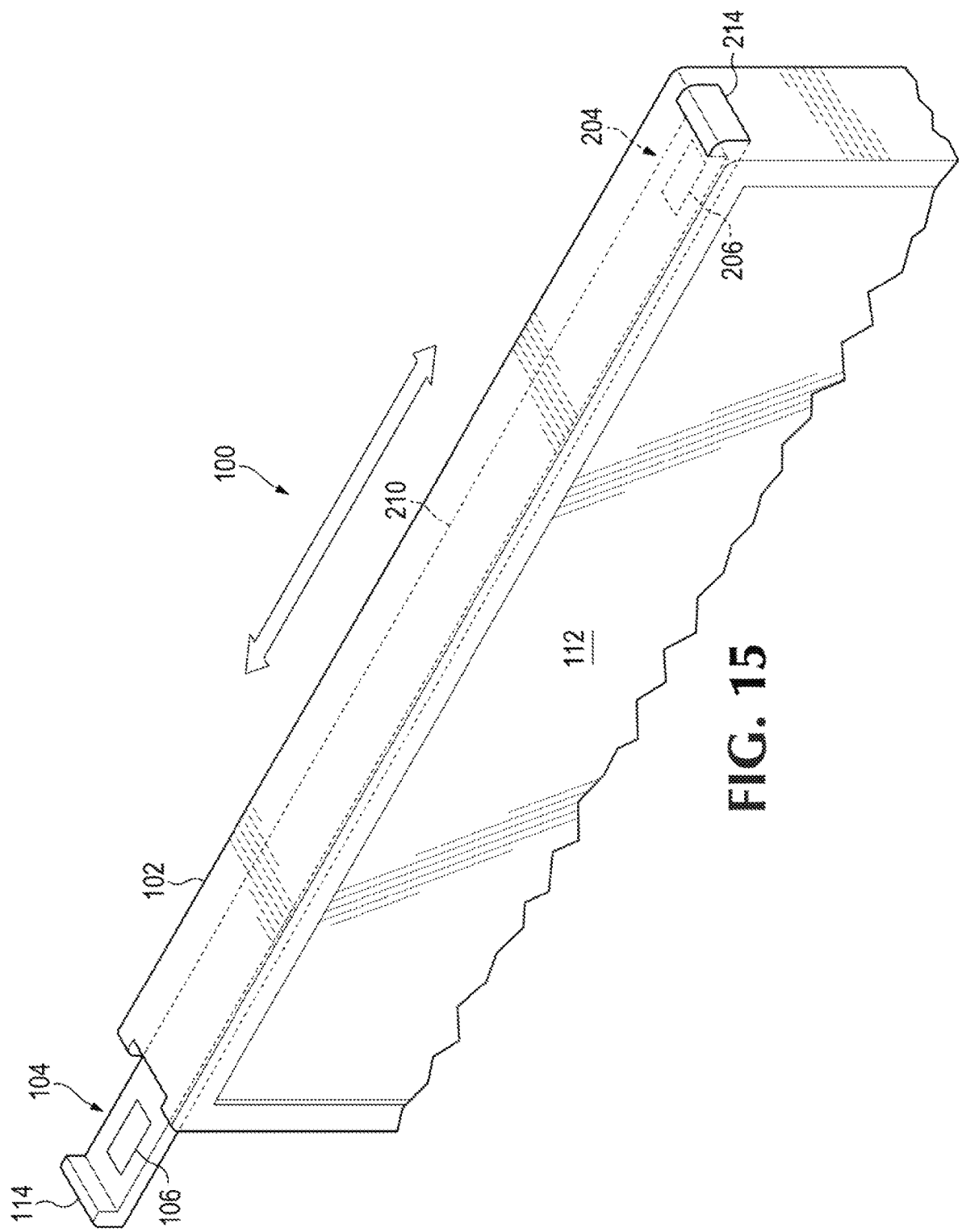
FIG. 15 depicts an example display device with example protractible hooks.

FIG. 15 depicts an example display device 100 with example protractible hooks 104 and 204. The housing 102 includes a second side wall having an aperture through which the second protractible hook protrudes when in the second protractible hook 204 is in a protracted position. The second protractible hook 204 moves in conjunction with movement of the first protractible hook 104. For example, the second protractible hook 204 is in a protracted position when the first protractible hook 104 is in the retracted position. In that example, the protractible hooks 104 and 204 may be coupled to a connective bar 210 (e.g., the hooks 104 and 204 may be integrated into the same unitary piece). The second protractible hook 204 may match the first protractible hook 104. For example, the second protractible hook 204 of FIG. 15 includes a second charging device 206 and a second face 214 that are the same as the first charging device 106 and the first face 114 of the first protractible hook 104. The cavity may extend between the apertures on each side wall of the housing 102. The cavity may be located behind the screen 112 or above the screen 112. A user may be able to have a protractible hook on either side of the monitor with an example device 100 of FIG. 15. Such customization may be desirable to a user based on their preferences, environment, and/or set up requirements. Indeed, a protractible hook with charging capabilities allows for a convenient stowage option for peripherals, such as headphone devices, to sustain and charge the peripheral when not in use.

All of the features disclosed in this specification (including any accompanying claims, abstract and drawings), and/or all of the elements of any method or process so disclosed, may be combined in any combination, except combinations where at least some of such features and/or elements are mutually exclusive.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus may be based only on the stimulus or a combination of stimuli including the stimulus. Furthermore, the use of the words "first," "second," or related terms in the claims are not used to limit the claim elements to an order or location, but are merely used to distinguish separate claim elements.

The present description has been shown and described with reference to the foregoing examples. It is understood, however, that other forms, details, and examples may be made without departing from the spirit and scope of the following claims.

What is claimed is:

1. A display device comprising:
   a housing defining a compartment;
   a proximity sensor within the housing;
   a protractible hook, the protractible hook fittable within the compartment of the housing;
   a charging device coupled to the protractible hook; and
   an actuation member to move the protractible hook from a retracted position to a protracted position where the protractible hook is positioned external to the housing, the actuation member including:
      a spring-loaded ejection device to eject the protractible hook; and
      a speed control device to control movement speed of the protractible hook between the retracted position and the protracted position;
   the actuation member to automatically transition the protractible hook from the retracted position to the protracted position when the proximity sensor detects a peripheral device within a predetermined threshold distance of the protractible hook.

2. The display device of claim 1, comprising:
   a face to cover a port to the compartment when the protractible hook is in a retracted position; and
   a user-accessible button to activate the actuation member.

3. The display device of claim 2, wherein the face:
   is integrated in the protractible hook; and
   is the user-accessible button.

4. The display device of claim 1, wherein the protractible hook includes:
   a cushion layer having a textile or rubber material; and
   an electronics layer, wherein the charging device is embedded in the electronics layer.

5. The display device of claim 1, further comprising:
   a magnet coupled to the protractible hook,
   wherein:
      the charging device is a near-field charging device;
      the protractible hook includes a wireless charging surface covering the near-field charging device, the wireless charging surface being flat;
      the magnet to guide alignment of a wirelessly chargeable device to rest on the wireless charging surface; and
      the charging device activates in response to contact between the wirelessly chargeable device and the wireless charging surface.

6. The display device of claim 1, wherein the housing includes a stop extending away from an interior surface of the compartment, and wherein the protractible hook includes a wall to abut the stop when the protractible hook is in the protracted position.

7. The display device of claim 6, wherein engagement between the wall of the protractible hook and the stop, when the protractible hook is in the protracted position, prevents removal of the protractible hook from within the compartment.

8. The display device of claim 1, wherein the actuation member automatically transitions the protractible hook from the protracted position to the retracted position when the proximity sensor does not detect a peripheral within a predetermined threshold of the protractible hook.

9. A display device comprising:
   a screen;
   a housing around the screen, the housing including a side wall having an aperture
   a proximity sensor within the aperture;
   a protractible hook having:
      a face fittable within the aperture when the protractible hook is in a retracted position;
      a surface perpendicular or oblique to the face;
   a charging device coupled to the protractible hook;
   an actuation member coupled to the protractible hook, the actuation member to move the protractible hook from the retracted position to a protracted position in response to detection of a peripheral device by the proximity sensor; and
   a retainment member coupleable to the protractible hook, the retainment member to sustain the protractible hook in the retracted position.

10. The display device of claim 9, further comprising:
    a speed control device to control movement speed of the protractible hook between the retracted position and the protracted position; and
    a controller to activate the charging device when the protractible hook reaches the protracted position.

11. The display device of claim 9, further comprising:
    a support coupled to the protractible hook at a fixed end, the support to sustain the protractible hook when a peripheral of 100 grams to 700 grams rests on the protractible hook, wherein:
    the protractible hook is a cantilever;
    the charging device is located adjacent to a free end of the protractible hook; and
    the surface of the protractible hook is a headphone receiving area that is curved or oblique with respect to screen; and
    the charging device is activatable in response to contact between the surface of the protractible hook and a wirelessly operable headphone device.

12. The display device of claim 9, further comprising:
    a second protractible hook that moves in conjunction with movement of the first protractible hook, such that the second protractible hook is in a protracted position when the first protractible hook is in the retracted position, wherein the housing includes a second side wall having an aperture through which the second protractible hook protrudes when the second protractible hook is in the protracted position.

13. An all-in-one computer system comprising:
    a display;
    a housing component coupled to the display, the housing component forming a cavity;
    a protractible hook integrated into the housing component, the protractible hook capable of supporting weight of a wirelessly operable device when the protractible hook is in a protracted position, the protractible hook having:
       a periphery that fits within the cavity;
       a holding area;
       a face aligned flush with a surface of the housing component when the protractible hook is in a retracted position; and
       a wall positioned on an end of the protractible hook opposite the face;
    a charging device integrated in the protractible hook;
    an actuation member mechanically coupled to the protractible hook, the actuation member to drive the protractible hook between the retracted position and the protracted position;
    a controller in communication with the actuation member; and a proximity sensor in communication with the controller, the controller to activate the actuation member to drive the protractible hook between the retracted position and the protracted position based on location data from the proximity sensor.

14. The all-in-one computer system of claim 13, wherein the controller activates the charging device based upon location data identified by the proximity sensor.

15. The all-in-one computer system of claim 14, wherein: the charging device provides power transfer and wireless data communication transfer with the wirelessly operable device when the wirelessly operable device is within a range threshold as indicated by the proximity sensor.

16. The all-in-one computer system of claim 15, wherein: the controller is pairable with wirelessly operable device and the controller comprises:
a processor resource; and
a machine-readable medium having a control program stored thereon, the control program, when executed by the processor resource, to cause the controller to:
  request system information of the wirelessly operable device;
  cause an interface to provide a power status indicator;
  in response to the system information indicating a software update exists, transfer the software update to the wirelessly operable device; and
  deactivate wireless charge operations and wireless data communication in response to a determination, by the controller, that the location data indicates the wirelessly operable device is outside the range threshold.

* * * * *